Patented July 21, 1953

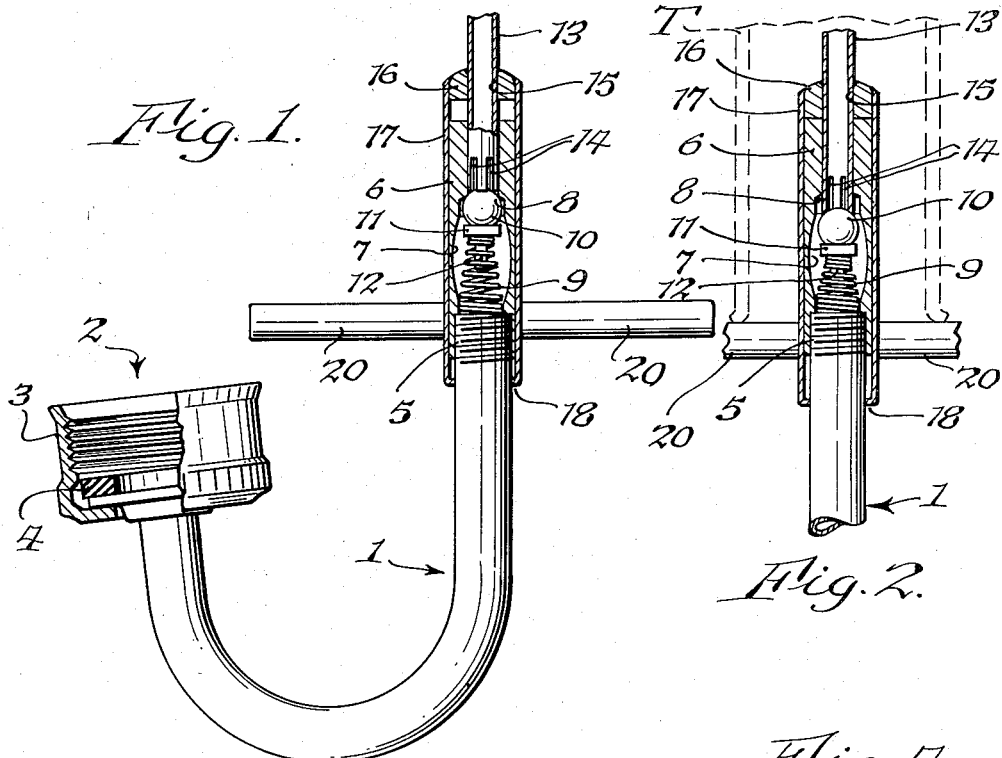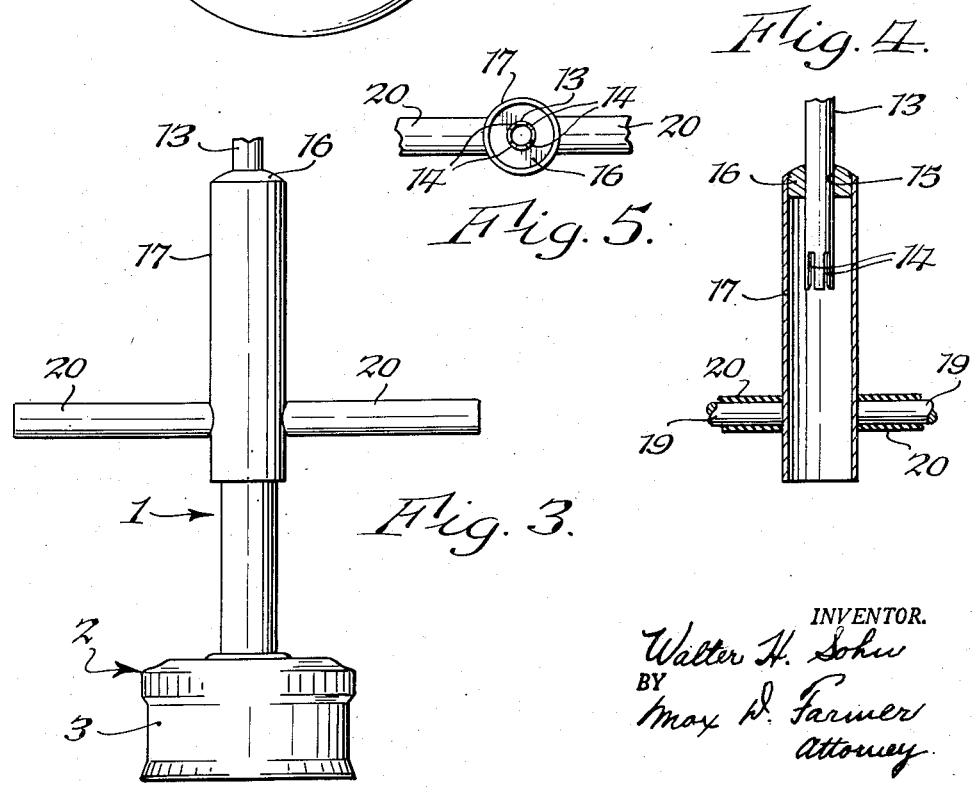

2,646,244

UNITED STATES PATENT OFFICE 2,646,244

VALVE FOR CONTAINER WASHERS

Walter H. Sohn, Rochester, N. Y.

Application October 14, 1947, Serial No. 779,752

4 Claims. (Cl. 251—8)

This invention relates to devices for washing containers, particularly those having relatively small entrance openings such as laboratory test tubes, flasks, beakers and the like. Such containers, some of which have constrictions below the open ends, are often difficult to wash or clean because of the difficulty of reaching and rubbing the inside side walls thereof.

An object of the invention is to provide an improved washing device which will effectively and quickly wash containers of this type in a simple and practical manner, which may be easily and quickly attached to a water pipe or faucet over a sink and left there, which requires no operation of the usual valve for each container, which is economical in its use of water, which has a long life and is free of service needs, and which is relatively simple, practical, efficient and inexpensive.

Other objects and advantages will be apparent from the following description of an embodiment of the invention, and the novel features will be particularly pointed out hereinafter in the appended claims.

In the accompanying drawing:

Fig. 1 is a side elevation, partly in longitudinal section, of a washer constructed in accordance with this invention, for attachment to a depending faucet discharge.

Fig. 2 is a view of part of the apparatus shown in Fig. 1 but with the parts in a different operative relation, such as occupied during a washing operation;

Fig. 3 is a side elevation of the same when the tube is unbent and is used on an upstanding discharge pipe or faucet end;

Fig. 4 is a sectional elevation of a part of the washer, before attachment to the other parts; and Fig. 5 is a bottom plan of the part shown in Fig. 4.

In the illustrated embodiment of the invention a tube 1 is provided at one end with the usual water hose swivel connection 2 which has a sleeve 3 that is swiveled on the end of the tube and which may be threaded upon an externally threaded faucet. An annular hose coupling washer 4, such as, of rubber, is disposed in the bottom of the sleeve 3. When the sleeve 3 is secured over the end of a faucet, the tube 1 will extend rigidly therefrom.

The free end of the tube 1 is externally threaded as at 5, and over this threaded end 5 is threaded one end of a sleeve 6. The passage 7 of the sleeve 6 has, intermediate of its ends, a shoulder 8 facing the free end of tube 1 and acting as a valve seat. A helical coil spring 9 is disposed in said passage 7 with one end abutting against the free end of tube 1, and its other end extending towards seat 8. A ball 10 is also disposed in the passage 7 between seat 8 and the spring 9. A disc 11 having a concave face receiving ball 10 is disposed in passage 7 between the ball and the adjacent end of the spring. A pin-like projection 12 extends from the face of disc 11 opposite from the ball and enters the center of spring 9 at its adjacent end. The spring 9 is under compression and resiliently urges ball 10 against seat 8 to close passage 7.

A tubular pin 13 fits and slides in the outer end of passage 7 and its inner end abuts against ball 10. The wall of pin 13, adjacent its inner end, is provided with notches 14 that serve as transverse passages. Pin 13 extends outwardly of sleeve 6 and there is secured in the passage 15 of an annular disc or ring 16, that in turn is secured in and closes the end of a shell or member 17. The shell 17 telescopes over the free end of sleeve 6 and extends beyond both ends of sleeve 6. The end which is adjacent tube 1 is flanged or spun inwardly as at 18, after being placed over sleeve 6, to engage behind the attached end of sleeve 6. The flange 18 limits outward sliding of shell 17 to a distance somewhat beyond the position in which the attached pin 13 releases said ball, after the ball has seated. Engagement of disc or ring 16 with the outer end of sleeve 6 limits movement of shell 17 over sleeve 6 towards tube 1, to a position after ball 10 has been unseated and transverse passages 14 are exposed to fluid flow past seat 8.

Secured to opposite sides of the exterior of shell 17 are aligned rods 19 and these rods may be covered by sleeves 20 of rubber, natural or substitute, or any other suitable material. Rods 19 may be welded or otherwise secured to shell 17. When containers considerably deeper than the distance from rods 19 with sleeves 20 to the outer end of shell 17 are to be washed, tube 13 preferably extends beyond disc or ring 16 to a position close to the bottom of the inverted container that is engaging with rods 19, so as to deliver wash water close to the bottom of the container.

In assembling the washer, the shell 17 and pin 13 are as shown in Figs. 4 and 5, and are telescoped over the sleeve 6 as shown in Fig. 1, and then the inner end of shell 17 is spun or otherwise turned or flanged inwardly behind the inner end of sleeve 6, which locks shell 17 from removal from the sleeve 6. Pin 13 is welded or brazed in ring 16, and the latter is welded or brazed in the end of shell 17. For faucets having depending discharge ends, the tube 1 is bent in an arc, as shown in Fig. 1, so that shell 17 will be upstanding when the sleeve 3 is threaded on the faucet outlet. For faucets or discharge pipes that have the outlet opening upwardly, the tube 1 is straight as shown in Fig. 3, so that shell 17 and pin 13 will be upstanding.

Looking at Fig. 2, it will be observed that when the ball 10 is away from its seat 8, the wall of passage 7 is downwardly divergent from a point at or above the horizontal diameter of the ball, to a point below the lower surface of the ball. This creates in the space between the ball surface and passage 7, an annular passage for the flow of water which is converging until it is more than half way past the ball and then starts to diverge slightly and merges into a cylindrical space around the inner end of the tubular pin. This converging passage acts like the converging passage of a nozzle and speeds up the flow of water past the ball and provides ample clearance for an adequate quantity flow of water when the ball is unseated. When the tubular pin is raised to close the valve, the resulting constriction in the passage 7 into which the ball moves, will cause the water to force the ball towards its seat and center it thereon.

In use, with the washer assembled and connected to a faucet or pipe supplying water or other cleansing liquid under pressure, one inverts a container, such as a test tube, shown by dash lines T in Fig. 2, over the upstanding shell 17 and pin 13, with the open end or face of the tube or container pressing on sleeves 20 on rods 19. Depression of container T will move shell 17 and pin 13 downwardly which unseats ball 10 and allows water or cleansing liquid to pass seat 8, through transverse passages 14 to pin 13, and upwardly against the bottom of the inverted container T. The water or liquid so discharged will spread as it strikes the bottom of the container and move downwardly over the side walls of the container and sweep off any removable matter that is adherent to the inner faces of the side walls of the container. This will force out of the open face of the container all removed solid and other matter, and continuously change all of the liquid in the inverted container. Upon lifting container T, the spring 9 will reseat ball 10 and shut off the water or washing liquid automatically.

The tube 1, passage 7 and pin 13 are, of course, open from end to end, except as passage 7 is closed by ball 10.

It will be understood that various changes in the details, materials and arrangements of parts, which have been herein described and illustrated in order to explain the nature of the invention, may be made by those skilled in the art within the principle and scope of the invention, as expressed in the appended claims.

I claim:

1. In a washer for containers such as laboratory test tubes, flasks, beakers and similar articles, of the type having a pipe connected to a source of washing liquid under pressure and a valve controlled discharge tube at its discharge end, that improvement in said valve and tube which comprises said pipe, a tubular sleeve having a passage endwise therethrough and a cylindrical exterior, and detachably coupled to the discharge end of said pipe to form an endwise extension thereof, said sleeve having a diameter larger than the outside diameter of the discharge end of said pipe to which it is coupled, a length of commercial, cylindrical, metallic tubing, uniform from end to end, fitting over and sliding on the outside peripheral surface of said sleeve, and of greater length than said sleeve so as to extend beyond both ends of the sleeve, the inner end of said length of tubing having an inwardly spun, peripheral flange encircling the pipe for engagement with the end of said sleeve to limit outward sliding movement of the tubing on said sleeve, an annular plug fixed within the outer end of said tubing, and engageable with the outer end of said sleeve to limit sliding of the tubing in the opposite direction, a cylindrical tube extending through the passage of said plug in both directions, open at both ends, fixed to the plug, and having its wall apertured close to its inner end, the passage of said sleeve, intermediate of its ends, having an annular, seat constriction facing the adjacent end of said pipe, a ball within and movable along said sleeve passage in a direction between the pipe and seat, for movement into and out of engagement with said seat to control fluid flow through said sleeve passage, the inner end of said tube engaging and forcing said ball from said seat when the tubing is moved toward said pipe and releasing said ball to seat when the tubing is moved to its limit in the other direction, and an arm fixed to and extending sidewise from the exterior of said tubing, by which the tubing may be moved endwise to displace said ball from its seat.

2. In a washer for containers such as laboratory test tubes, flasks, beakers and the like, an improved valve comprising an upstanding tube, for supplying water under pressure and having an open free end, a tubular sleeve detachably coupled to and telescoping with the free end of said tube, so as to form an upstanding extension thereof, the passage of said sleeve being open at both ends and having, intermediate of its ends, a shoulder seat facing and spaced from said free end of said tube and forming a single, central passage therethrough, a coil spring having one end abutting said free end of said tube within said sleeve and extending towards said seat, a ball within said sleeve between said spring and seat, free to move along said sleeve with clearance, and resiliently urged against said seat by said spring, the inside wall of said sleeve at the side of said seat towards said tube being cylindrical in the area adjoining the seat, for a substantial distance from the seat, and then increasing in diameter towards said tube for a further distance from the seat and beyond the ball when the ball is fully unseated, a tubular shell telescoping over said sleeve and extending in both directions beyond the ends of said sleeve, a tubular pin fixed to the outer end of said shell, extending within said shell towards said ball and having a transverse passage close to its inner end, said pin being open at its outer end, and its inner end, when said shell is moved endwise over said sleeve towards said tube, engaging said ball and unseating it before the outer end of said shell engages the outer end of said sleeve, and carrying said transverse passage beyond said seat as said ball is unseated, the inner end of said shell having an inturned portion engaging against that end of said sleeve which is attached to said tube and limiting outward sliding movement of said shell, and an arm on the exterior of said shell by which the shell may be moved towards said tube.

3. In a washer for containers such as laboratory test tubes, flasks, beakers, and the like, an improved valve comprising an upstanding tube for supplying water under pressure and having an open free end, a tubular sleeve with cylindrical periphery detachably coupled to the free, upper end of said tube and forming an upstanding extension thereof, the passage of said sleeve being open from end to end and having intermediate of its ends a shoulder seat facing said tube, a ball-like valve element engaging said seat, a coil spring within the passage of said sleeve compressed against said valve element to urge the latter resiliently against said seat, a tubular pin fitting and sliding in the outer end of said sleeve passage and adjacent its inner end having a transverse passage in its wall, and engaging and unseating said valve element as the pin is pushed inwardly, a cylindrical, shell-like member of metal tubing, an abutment fitted within the outer end of said member, through which said pin extends in both directions endwise thereof, and to which said pin is coupled for endwise movement therewith, said member telescoping and sliding on the sleeve and tube and extending beyond both ends of the sleeve, and having an inwardly spun flange at its inner end engaging against the inner end of the sleeve for limiting outward movement of said pin to a distance beyond the position in which said pin releases said valve element after said element has seated, the passage of said sleeve below said seat and in the portion into which said ball-like valve element is displaced when unseated by said tubular pin, being downwardly divergent along the lower half of the valve element to provide between the latter and said divergent passage, a converging water passage, and a lateral projection on said member for engagement and operation by the open end of an inverted container, whereby when one pushes down on said projection, said pin will unseat said valve element and water may pass upwardly through said pin and be discharged as a stream.

4. An improved valve comprising a tube having an open, free end, a sleeve screwed over the end of the tube and having a fully cylindrical periphery, the passage of said sleeve having between its ends an annular, imperforate seat facing the end of the tube, a valve element in said passage movable into and out of engagement with said seat, a tubular pin sliding in and closing the outer end of said passage open at both ends and extending outwardly beyond the sleeve, a cylindrical metal shell uniform in thickness from end to end, sliding and fitting over said sleeve upon the ends thereof, extending in both directions beyond the ends of the sleeve, and having its inner end turned inwardly to engage against the inner end of said sleeve to limit outward movement of the shell, an annular plug fitting and closing the outer end of said shell with the tubular pin passing through and fixed to said plug so as to be an integral part thereof and extending in both directions therefrom, said shell having diametrically aligned arms extending laterally from opposite sides of the shell adjacent its inner end.

WALTER H. SOHN.

References Cited in the file of this patent

UNITED STATES PATENTS

| Number | Name | Date |
|---|---|---|
| 391,173 | McGahan | Oct. 16, 1888 |
| 515,556 | Smeallie | Feb. 27, 1894 |
| 1,023,630 | Elkins | Apr. 16, 1912 |
| 1,535,405 | Ernst | Apr. 28, 1925 |
| 1,607,727 | Diersen | Nov. 23, 1926 |
| 1,759,904 | Kass | May 27, 1930 |
| 1,813,982 | Woodruff | July 14, 1931 |
| 1,819,452 | Wright | Aug. 18, 1931 |
| 1,944,739 | Hunt | Jan. 23, 1934 |
| 1,946,882 | Russel | Feb. 13, 1934 |
| 1,986,944 | Schoene | Jan. 8, 1935 |

FOREIGN PATENTS

| Number | Country | Date |
|---|---|---|
| 211,862 | Germany | July 24, 1909 |
| 438,467 | Great Britain | of 1935 |